(12) United States Patent
Cheruku et al.

(10) Patent No.: US 10,963,588 B1
(45) Date of Patent: Mar. 30, 2021

(54) ANALYZING RECORDINGS FOR DATA TO BE PROTECTED AND IDENTIFYING RECIPIENTS AND ALERTS

(71) Applicant: International Business Machines Corporation, Armonk, NY (US)

(72) Inventors: Srinivas Cheruku, Visakhapatnam (IN); Srinivasulu Reddy Botta, Visakhapatnam (IN); Kasi Gonguntla, Vizag (IN); Ganesh Devavarapu, Visakhapatnam (IN); Venkata Ratnam Alubelli, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/669,286

(22) Filed: Oct. 30, 2019

(51) Int. Cl.
| | |
|---|---|
| *H04M 1/66* | (2006.01) |
| *G06F 21/62* | (2013.01) |
| *H04L 12/58* | (2006.01) |
| *H04M 1/725* | (2021.01) |
| *G06N 20/00* | (2019.01) |
| *H04W 4/21* | (2018.01) |

(52) U.S. Cl.
CPC ......... *G06F 21/6245* (2013.01); *G06N 20/00* (2019.01); *H04L 51/32* (2013.01); *H04M 1/72538* (2013.01); *H04W 4/21* (2018.02); *H04M 2250/52* (2013.01)

(58) Field of Classification Search
USPC .......... 340/539.13; 379/433.04, 47; 382/103, 382/118; 713/170
See application file for complete search history.

(56) References Cited

U.S. PATENT DOCUMENTS

| | | | |
|---|---|---|---|
| 8,634,603 B2 | 1/2014 | Kiyohara et al. | |
| 9,143,601 B2 | 9/2015 | Padmanabhan et al. | |
| 9,165,457 B1 * | 10/2015 | Bertagnolli, Jr. | ........ H04Q 9/00 |
| 9,374,374 B2 | 6/2016 | Steinberg et al. | |
| 10,089,327 B2 | 10/2018 | Sweet, III et al. | |
| 10,320,757 B1 * | 6/2019 | Secker-Walker | ..... H04L 9/0894 |

(Continued)

FOREIGN PATENT DOCUMENTS

| | | |
|---|---|---|
| CN | 107864277 A | 3/2018 |
| KR | 101657635 B1 | 9/2016 |
| WO | 2014172624 | 10/2013 |

OTHER PUBLICATIONS

Mell et al., "Effectively and Securely Using the Cloud Computing Paradigm", dated Oct. 7, 2009, NIST, Information Technology Laboratory, Total 80 pages.

(Continued)

*Primary Examiner* — David Q Nguyen
(74) *Attorney, Agent, or Firm* — Janaki K. Davda; Konrad, Raynes, Davda and Victor LLP

(57) ABSTRACT

Provided are techniques for analyzing recordings for data to be protected and identifying recipients and alerts. A recording is stored in temporary storage. Data to be protected about a situation is identified in the recording. One or more recipients are identified based on the data to be protected about the situation. One or more alerts for the one or more recipients are identified based on the data to be protected about the situation. The one or more alerts are sent to the one or more recipients along with the recording. The recording is deleted from the temporary storage.

20 Claims, 8 Drawing Sheets

(56) References Cited

U.S. PATENT DOCUMENTS

| | | | |
|---|---|---|---|
| 10,580,272 B1* | 3/2020 | Edwards | G06K 9/00261 |
| 2006/0256959 A1* | 11/2006 | Hymes | H04M 1/72547 |
| | | | 379/433.04 |
| 2011/0092248 A1 | 4/2011 | Evanitsky | |
| 2012/0229647 A1 | 9/2012 | Calman et al. | |
| 2013/0010051 A1* | 1/2013 | Shlaimoun | H04L 51/24 |
| | | | 348/14.02 |
| 2013/0194438 A1 | 8/2013 | Sweet, III et al. | |
| 2013/0286223 A1 | 10/2013 | Latta et al. | |
| 2014/0177812 A1* | 6/2014 | Barrett | H04M 3/5116 |
| | | | 379/47 |
| 2015/0269835 A1* | 9/2015 | Benoit | H04M 19/04 |
| | | | 340/539.13 |
| 2017/0195633 A1 | 7/2017 | Billau et al. | |
| 2018/0278801 A1* | 9/2018 | Ohno | G06Q 50/00 |
| 2019/0026312 A1 | 1/2019 | Sweet III et al. | |
| 2019/0035257 A1* | 1/2019 | Nepo | G08B 25/016 |
| 2020/0074148 A1* | 3/2020 | Xu | G06K 9/00308 |

OTHER PUBLICATIONS

Mell et al., "The NIST Definition of Cloud Computing", dated Sep. 2011, Recommendations of the National Institute of Standards and Technology, Total 7 pages.

Machine Translation for CN107864277A, published Mar. 30, 2018, Total 16 pages.

"Selecting a Security Camera for Your Home", retrieved from the Internet on Oct. 14, 2019, at URL>https://homealarmreport.com/security-cameras/, Total 12 pages.

U.S. Pat. No. 10,089,327, published Oct. 2, 2018 is the English counterpart for KR101657635B1.

Publication 2013/0194438, published Aug. 1, 2013 is an English Counterpart for KR101657635B1.

Publication 2019/0026312, published Jan. 24, 2019 is an English Counterpart for KR101657635B1.

D. Faggella "AI for Crime Prevention and Detection—5 Current Applications", retrieved from the Internet on Feb. 2, 2019, at URL>https://emerj.com/ai-sector-overviews/ai-crime-prevention-5-current-applications/, Total 10 pages.

J. Vincent "Artificial intelligence is going to supercharge surveillance" retrieved from the Internet on Jan. 23, 2018, at URL>https://www.theverge.com/2018/1/23/16907238/artificial-intelligence-surveillance-cameras-security, Total 14 pages.

"CVIGIL—Electric Commission of India" ECI Main Website, retrieved from the Internet on Oct. 17, 2019 at URL>about:reader?url=https://eci.gov.in/cvigil/, Total 2 pages.

Wikipedia "Surveillance", (online) retrieved from the Internet on Oct. 17, 2019 at URL>https://en.wikipedia.org/wiki/Surveillance, Total 15 pages.

* cited by examiner

US 10,963,588 B1

ANALYZING RECORDINGS FOR DATA TO BE PROTECTED AND IDENTIFYING RECIPIENTS AND ALERTS

BACKGROUND

Embodiments of the invention relate to analyzing recordings for data to be protected and identifying recipients and alerts. The recordings may be images, audio recordings or videos. The data describes a situation.

With more people carrying smart phones with cameras, there are many more images being captured. In some cases, these images are saved to the smart phone and/or to a cloud data store. The images may include data (e.g., secured content) about a situation (e.g., someone is injured and needs medical attention).

In some cases, a user wants to send an image with such data to a recipient without saving the image in the smart phone or in the cloud data store.

Currently, when an image is taken and sent to another smart phone, the image is also automatically saved to the local device or to the cloud data store, even if the user does not want the image saved (e.g., because the image contains secure content). Then, the user has to manually clean up the storage (i.e., delete the image from the smart phone or the cloud data store). That is, the image is saved and then has to be manually deleted, which is tedious and creates extra work for the user.

SUMMARY

In accordance with embodiments, a computer-implemented method is provided for analyzing recordings for data to be protected and identifying recipients and alerts. The computer-implemented method comprises operations. A recording is stored in temporary storage. Data to be protected about a situation is identified in the recording. One or more recipients are identified based on the data to be protected about the situation. One or more alerts for the one or more recipients are identified based on the data to be protected about the situation. The one or more alerts are sent to the one or more recipients along with the recording. The recording is deleted from the temporary storage.

In accordance with other embodiments, a computer program product is provided for analyzing recordings for data to be protected and identifying recipients and alerts. The computer program product comprises a computer readable storage medium having program code embodied therewith, the program code executable by at least one processor to perform operations. A recording is stored in temporary storage. Data to be protected about a situation is identified in the recording. One or more recipients are identified based on the data to be protected about the situation. One or more alerts for the one or more recipients are identified based on the data to be protected about the situation. The one or more alerts are sent to the one or more recipients along with the recording. The recording is deleted from the temporary storage.

In yet other embodiments, a computer system is provided for analyzing recordings for data to be protected and identifying recipients and alerts. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A recording is stored in temporary storage. Data to be protected about a situation is identified in the recording. One or more recipients are identified based on the data to be protected about the situation. One or more alerts for the one or more recipients are identified based on the data to be protected about the situation. The one or more alerts are sent to the one or more recipients along with the recording. The recording is deleted from the temporary storage.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1:
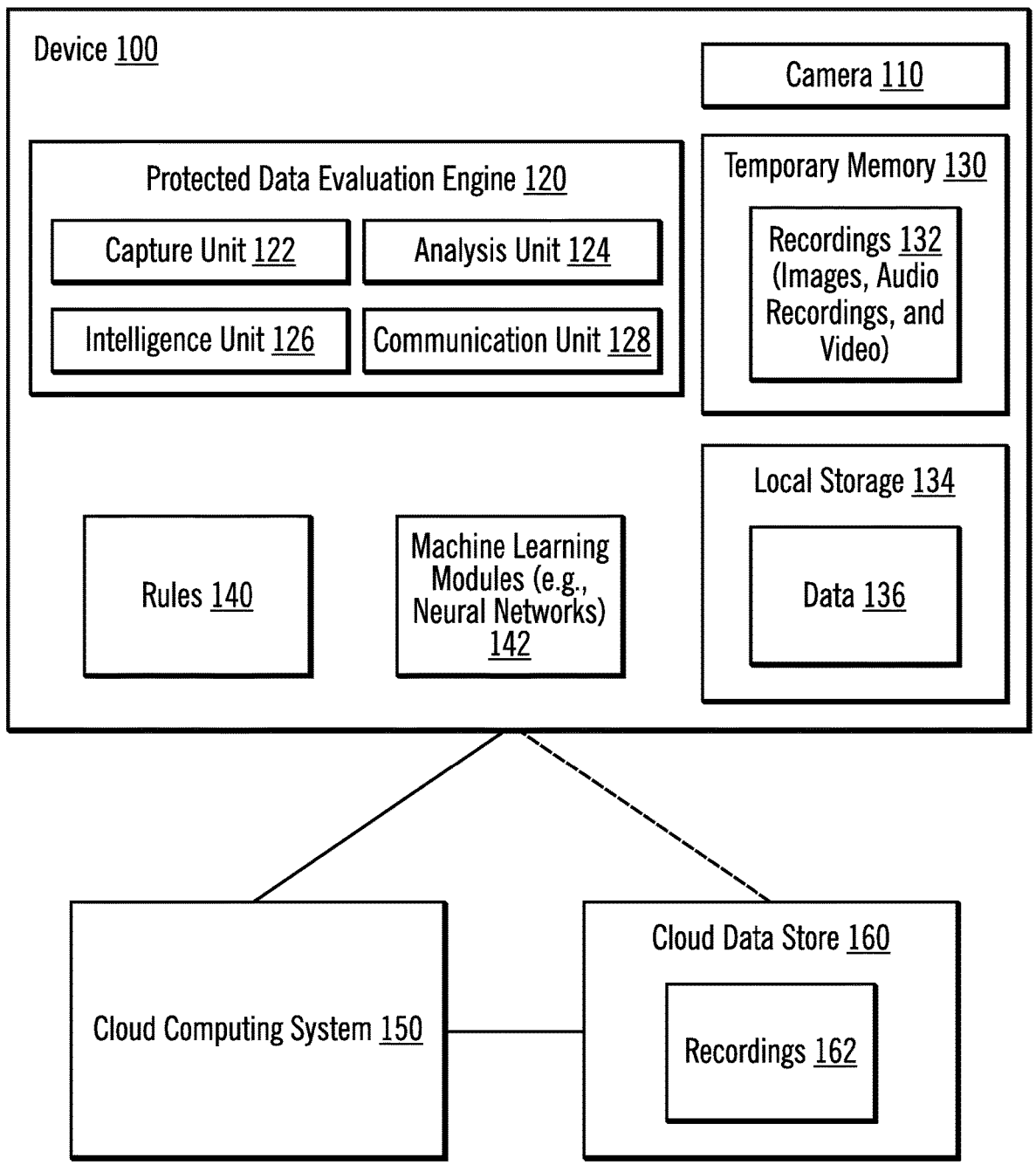
FIG. 1 illustrates, in a block diagram, a computing environment in accordance with certain embodiments.

FIG. 1 illustrates, in a block diagram, a computing environment in accordance with certain embodiments. A device 100 is coupled to a cloud computing system 150. The device 100 includes a camera 110, a protected data evaluation engine 120, a temporary memory 130 for storing recordings 132, a local storage 134 for storing other data 136, rules 140, and machine learning modules 142.

The cloud computing system 150 is coupled to a cloud data store 160 that stores recordings 162. The cloud data store 160 may be described as permanent storage (e.g., a disk drive, a tape drive, etc.). In certain embodiments, the protected data evaluation engine 120 accesses the cloud data store 160 via the cloud computing system 150. In other embodiments, the protected data evaluation engine 120 accesses the cloud data store 160 directly.

In certain embodiments, the device 100 may be a smart phone, tablet computer, laptop computer or other device with a camera. The local storage 134 may be described as permanent storage (e.g., a hard drive of a computer, a Solid-State Drive (SSD) of a computer, internal storage of a smart phone, etc.). In certain embodiments, recordings 132 may include images (e.g., photos), audio recordings, and videos. A video may be described as a series of images with an audio recording. In certain embodiments, the rules 140 are pre-defined rules that may be modified at any time by the user of the device 100 or by anyone authorized to change the rules 140. The rules 140 also include recommended alerts (e.g., if a recording shows a fire, the recommendation is to alert a fire station).

In certain embodiments, the camera 110 captures a recording, which the protected data evaluation engine 120 saves in the temporary memory 130. The protected data evaluation engine 120 may be described as an inbuilt option that sends the recording directly to one or more recipients using the temporary memory 130. Then, after sending the recording to the one or more recipients, the protected data evaluation engine 120 deletes the recording from the temporary memory 130 without user intervention. The one or more recipients may be relatives, friends, members of a department or group, people who are included in the recording, etc. With embodiments, the protected data evaluation engine 120 determines the one or more recipients using one or more rules 140 or using a machine learning module 142.

In certain embodiments, the protected data evaluation engine 120 includes a capture unit 122, an analysis unit 124, an intelligence unit 126, and a communication unit 128. The capture unit 122 captures an image, an audio recording or a video and sends the recording to the analysis unit 124. The analysis unit 124 analyzes the recording and identifies persons, places, and things in the recording and passes this information to the intelligence unit 126. The intelligence unit 126 performs smart analysis on the information to identify any data to be protected about any situation. Data to be protected may be any data identified as to be protected by a user (e.g., via rules or training of a machine learning module), confidential data (e.g., health information, bank information, a social security number, etc.) or other data that should be disclosed to a limited number of recipients (rather than being publicly available). In certain embodiments, the data identifies a time, a date, any people in the recording, a location at which the recording was made (e.g., a place), things (e.g., a fire, a car, a building, etc.), health information, an event (e.g., a party, a school gathering, etc.), etc. In certain embodiments, the situation may be described as a topic about the data (e.g., in the recording, a person is shown with an injury, so the situation is a health condition topic). For example, situations may include health conditions, psychological conditions, accidents, fires, etc. If data to be protected about such a situation is found, the intelligence unit 126 identifies one or more recipients to receive one or more alerts and the recording and passes this information to the communication unit 128. The communication unit 128 sends the one or more alerts to the one or more recipients, along with the recording. The alerts are sent automatically, without user intervention.

In certain embodiments, the protected data evaluation engine 120 analyzes a recording that is an image using facial recognition (e.g., comparing faces in the image to stored faces). In certain embodiments, the protected data evaluation engine 120 analyzes a recording that is an audio recording using voice analysis (e.g., comparing voices in the audio recording to stored voice recordings).

The recording is also analyzed to determine whether there is data to be protected about a situation. The data to be protected may also be referred to as secure data or sensitive data. For example, data to be protected about a situation may be an image of someone who was in an accident and needs medical help. With embodiments, the protected data evaluation engine 120 determines whether there is data to be protected about a situation using one or more rules 140 or using a machine learning module 142.

Once the recording is analyzed for data to be protected about a situation, the protected data evaluation engine 120 selects one or more recipients based on the analysis and sends the recording to the one or more recipients. For example, if the recording shows a current car accident, the recording may be sent to a fire department, a police department, a hospital, etc.

By using the temporary memory 130, the protected data evaluation engine 120 avoids the use of physical/permanent memory and avoids the risks of recordings with data to be protected remaining on the device 100. Thus, data protection concerns are avoided.

Because the protected data evaluation engine 120 automatically deletes recordings from the temporary memory 130, there is no need for the user to manually clean up storage (by deleting recordings) when there are low space memory errors.

Based on analysis of the recording, the protected data evaluation engine 120 may also alert the user of the device 100 (e.g., the analysis shows a brush fire is nearby, which may be a dangerous situation for the user).

Figure 2:
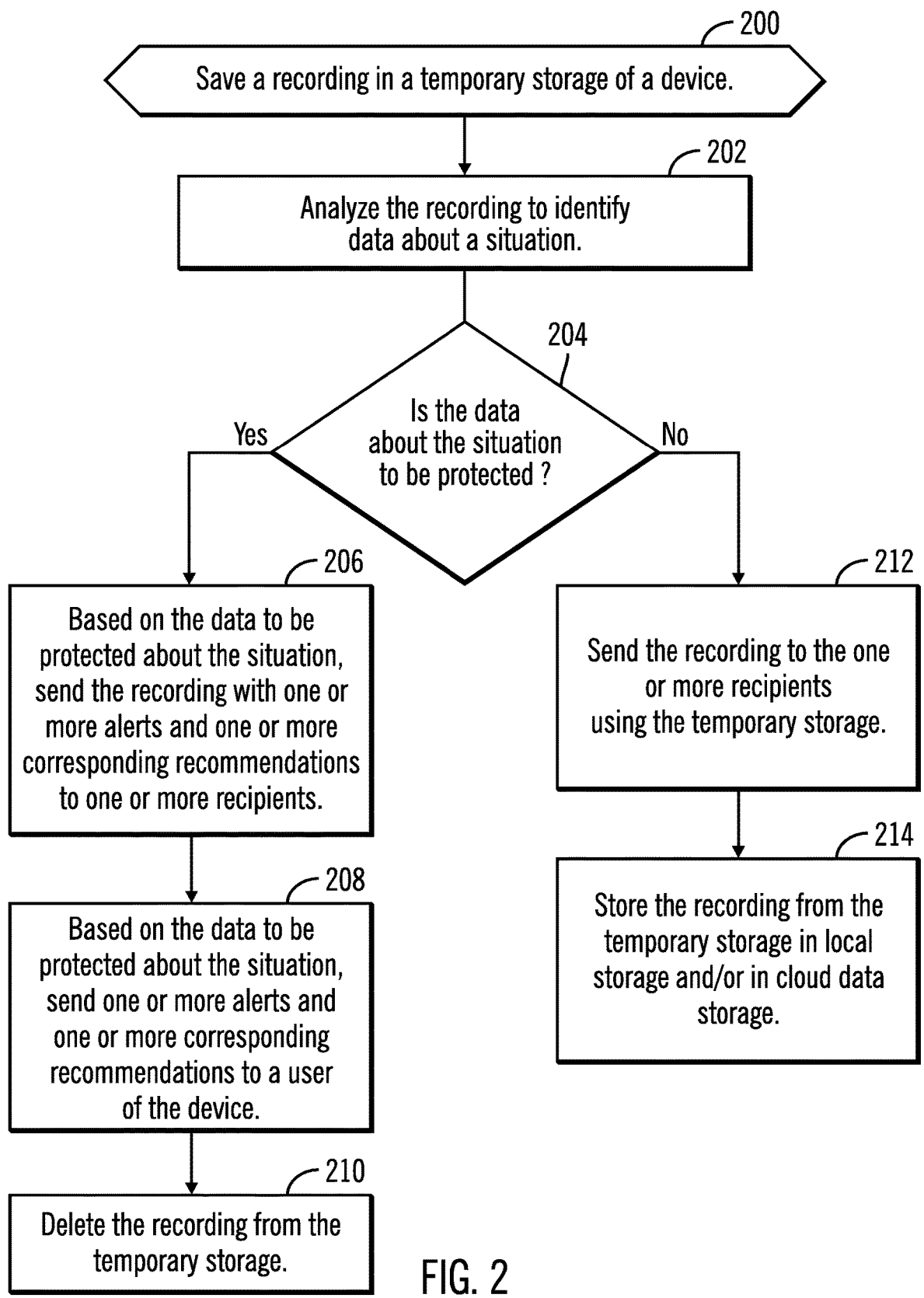
FIG. 2 illustrates, in a flowchart, operations for processing a recording in accordance with certain embodiments.

FIG. 2 illustrates, in a flowchart, operations for processing a recording in accordance with certain embodiments. Control begins at block 200 with the protected data evaluation engine 120 saving a recording in temporary storage. In block 202, the protected data evaluation engine 120 analyzes the recording to identify data about a situation.

In block 204, the protected data evaluation engine 120 determines whether the data about the situation is to be protected. The protected data evaluation engine 120 may determine whether the data is to be protected using rules 140 or a machine learning module 142. If so, processing continues to block 206, otherwise, processing continues to block 212.

In block 206, based on the data to be protected about the situation, the protected data evaluation engine 120 sends the recording (using the temporary storage) with one or more alerts and one or more corresponding recommendations to one or more recipients. The protected data evaluation engine 120 may identify the one or more alerts and the one or more corresponding recommendations using rules 140 or a machine learning module 142 based on the data to be protected. The protected data evaluation engine 120 may identify the one or more recipients using rules 140 or a machine learning module 142 based on the data to be protected. For example, if the recording is an image that indicates that there is a fire, then a recipient may be a fire station. As another example, if the recording is an image of a child near a fire, then the recipients may be the child's parents and the fire station. On the other hand, if the recording is an image of an adult near a fire, then the recipients may be a spouse and the fire station. Thus, there are different recipients based on the data to be protected about the situation.

In block 208, based on the data to be protected about the situation, the protected data evaluation engine 120 sends one or more alerts and one or more corresponding recommendations to a user of the device. The protected data evaluation engine 120 may identify the one or more alerts and the one or more corresponding recommendations using rules 140 or a machine learning module 142 based on the data to be protected. For example, if a car is quickly approaching the user, an alert may be raised for the user with a recommendation to move to a specific safe place out of the way of the car (e.g., with the recording analysis unit 120 predicting the trajectory (path) of the car). In various embodiments, the user and any of the one or more recipients may receive the same one or more alerts and corresponding recommendations or may receive one or more different alerts and corresponding recommendations.

In block 210, the protected data evaluation engine 120 deletes the recording from the temporary storage. With such a deletion, the data to be protected is removed from the temporary storage and is not stored elsewhere.

In block 212, the protected data evaluation engine 120 sends the recording to the one or more recipients using the temporary storage. The protected data evaluation engine 120 may identify the one or more recipients using rules 140 or a machine learning module 142 based on the data. In block 214, the protected data evaluation engine 120 stores the recording from the temporary storage in local storage and/or in cloud data storage. In this manner, data that is not to be protected is stored in the temporary storage and is stored elsewhere (i.e., local storage and/or cloud data storage).

The protected data evaluation engine 120 analyzes the recording details to identify the data to be protected about a situation. For example, if a user takes a selfie, and the protected data evaluation engine 120 sees a car driving fast towards the user, the protected data evaluation engine 120 issues an alert to the user on the device 120. For example, the alert is any combination of a pop up message, a loud sound, a message read out loud, etc.

In certain embodiments, the functionality of the protected data evaluation engine 120 is separated into the capture unit 122, the analysis unit 124, the intelligence unit 126, and the communication unit 128 that work together. In certain embodiments, the intelligence unit 126 receives data from the analysis unit 124 and determines whether the data indicates a typical (e.g., normal or non-dangerous) situation or an atypical (e.g., dangerous) situation. If the data is interpreted as a typical situation, then the intelligence unit 126 identifies one set of recipients to receive the recording. If the data is interpreted as atypical, then the intelligence unit 126 identifies another set of recipients to receive the recording (e.g., police station, fire station, hospital, government authorities, etc.). If data is interpreted as atypical for the user using the device 100, the intelligence unit may also determine that the user is to be alerted in addition to other recipients (e.g., the police). The communication unit 128 sends the recording to the identified recipients based on input from the intelligence unit 126.

In certain embodiments, the protected data evaluation engine 120 alerts authorities based on situations (e.g., dangerous situations) identified in a user's captured recording. In particular, the protected data evaluation engine 120 saves a user captured recording in a temporary memory of a device and analyzes the recording in real-time on the device. The protected data evaluation engine 120 identifies one or more persons (e.g., via facial recognition) and the presence/absence of data to be protected about a situation (e.g., health condition) of someone in the recording and further alerts one or more recipients (e.g., parents, friends, relatives, a nearest authority (e.g., a hospital, a beach rescue team, zoo authorities, psychiatrist, police, etc.)) with a recommendation and with the recording. Then, the protected data evaluation engine 120 deletes the recording from the temporary memory after sending the recording to the one or more recipients. With embodiments, the recording may be sent any distance to any location or to any device and is not limited to a specific proximity, location or device, and the receiving device does not need to be in the same network (e.g., cellular network).

In certain embodiments, once the camera 110 captures the recording, the protected data evaluation engine 120 analyzes the recording for the face of the user capturing the recording using the camera 110 of the device 100, for faces of others in the recording, and for data to be protected about situations. The situations may indicate health conditions, psychological conditions, accidents, fires, etc.

Figure 3:
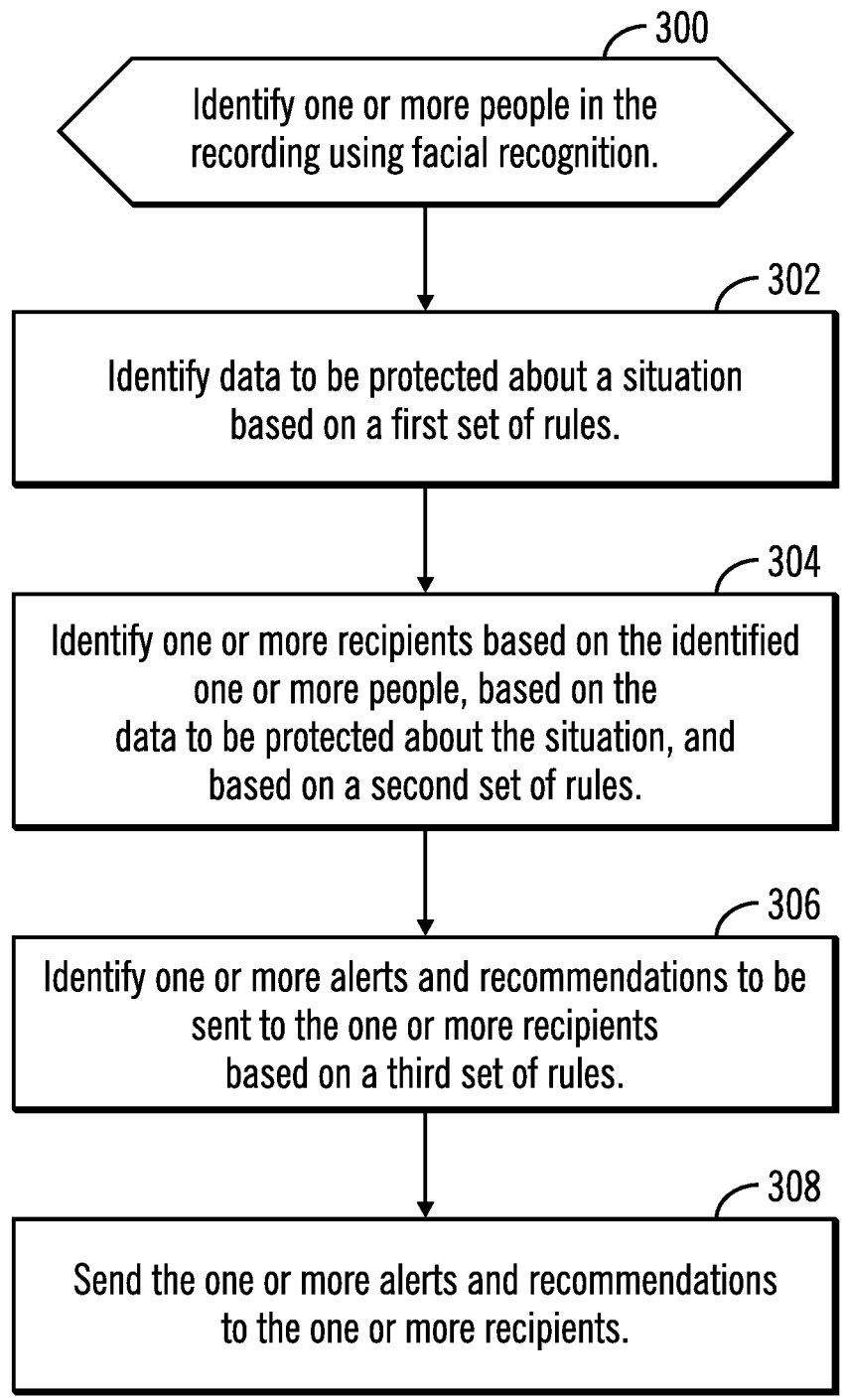
FIG. 3 illustrates, in a flowchart, operations for using rules to identify data to be protected, one or more recipients, one or more alerts, and one or more recommendations in accordance with certain embodiments.

FIG. 3 illustrates, in a flowchart, operations for using rules to identify data to be protected, one or more recipients, one or more alerts, and one or more recommendations in accordance with certain embodiments. Control begins at block 300 with the protected data evaluation engine 120 identifying one or more people in the recording using facial recognition. In block 302, the protected data evaluation engine 120 identifies data to be protected about a situation based on a first set of rules of the rules 140, and the first set of rules incorporate which data is to be protected (e.g., the rule indicate that blood pressure information, location, and names of people in an image are to be protected). In certain embodiments, the input to the first set of rules is the recording, and the output of the first set of rules is an identification of the data to be protected in the recording.

In block 304, the protected data evaluation engine 120 identifies one or more recipients based on the identified one or more people, based on the data to be protected about the situation, and based on a second set of rules of the rules 140. In certain embodiments, the inputs to the second set of rules are the identified one or more people and the data to be protected, and the output of the second set of rules is an identification of the one or more recipients of the recording.

In block 306, the protected data evaluation engine 120 identifies one or more alerts and recommendations to be sent to the one or more recipients based on a third set of rules of the of the rules 140. In certain embodiments, the inputs to the third set of rules are the one or more recipients and the data to be protected, and the output of the second machine second set of rules is an identification of the one or more alerts and recommendations for each of the one or more recipients.

In block 308, the protected data evaluation engine 120 sends the one or more alerts and recommendations to the one or more recipients.

Figure 4:
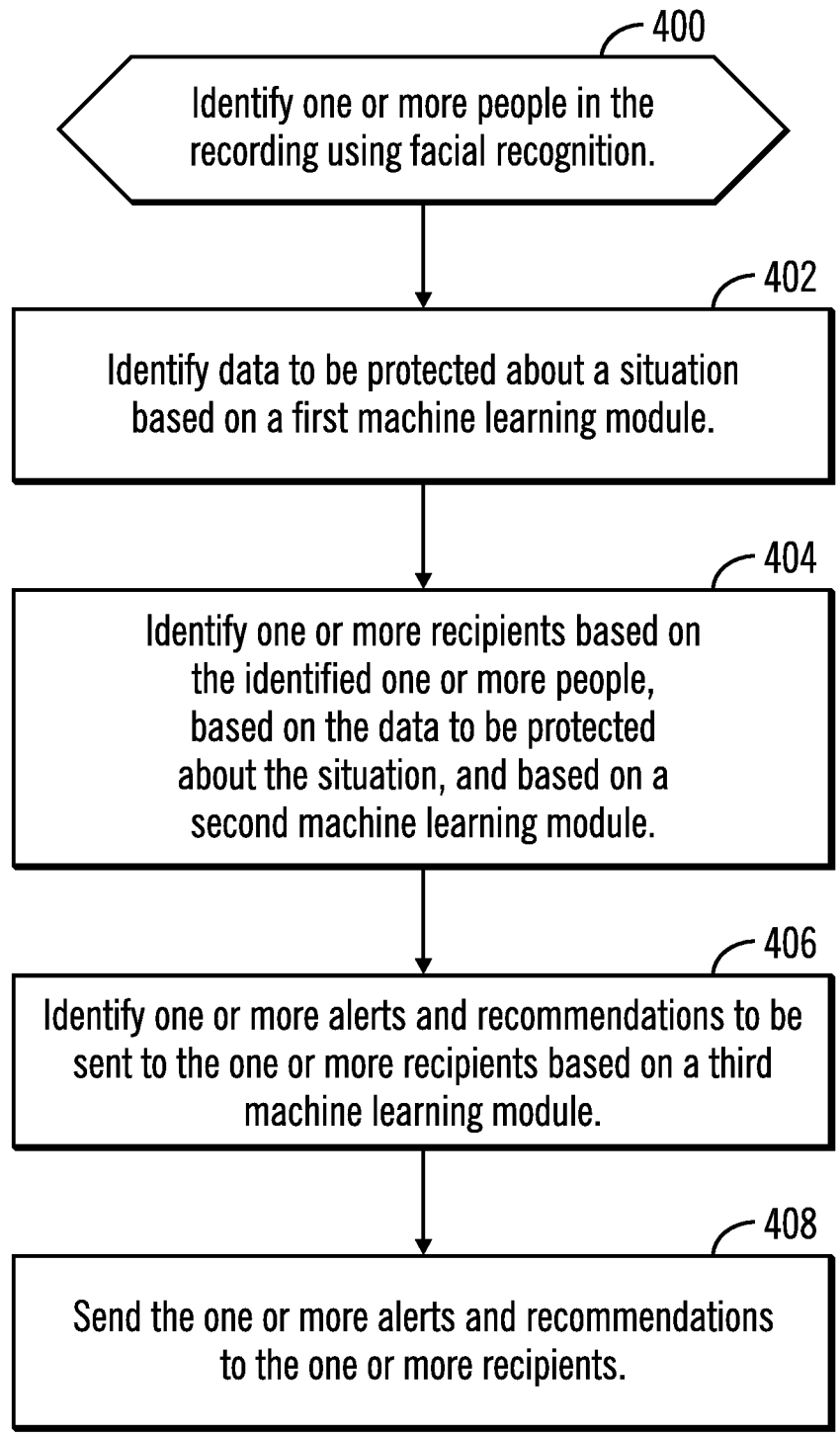
FIG. 4 illustrates, in a flowchart, operations for using machine learning modules to identify data to be protected, one or more recipients, one or more alerts, and one or more recommendations in accordance with certain embodiments.

FIG. 4 illustrates, in a flowchart, operations for using machine learning modules to identify data to be protected, one or more recipients, one or more alerts, and one or more recommendations in accordance with certain embodiments. Control begins at block 400 with the protected data evaluation engine 120 identifying one or more people in the recording using facial recognition. In block 402, the protected data evaluation engine 120 identifies data to be protected about a situation based on a first machine learning module of the machine learning modules 142, and the first machine learning module incorporates which data is to be protected (e.g., blood pressure information, location, and names of people in an image are to be protected). In certain embodiments, the input to the first machine learning module is the recording, and the output of the first machine learning module is an identification of the data to be protected in the recording.

In block 404, the protected data evaluation engine 120 identifies one or more recipients based on the identified one or more people, based on the data to be protected about the situation, and based on a second machine learning module of the machine learning modules 142. In certain embodiments, the inputs to the second machine learning module are the identified one or more people and the data to be protected, and the output of the second machine learning module is an identification of the one or more recipients of the recording.

In block 406, the protected data evaluation engine 120 identifies one or more alerts and recommendations to be sent to the one or more recipients based on a third machine learning module of the machine learning modules 142. In certain embodiments, the inputs to the third machine learning module are the one or more recipients and the data to be protected, and the output of the second machine learning module is an identification of the one or more alerts and recommendations for each of the one or more recipients.

In block 408, the protected data evaluation engine 120 sends the one or more alerts and recommendations to the one or more recipients.

In certain embodiments, different alerts and recommendations are sent to different recipients. In certain embodiments, one group of recipients (e.g., family and friends) receives a first alert and a first recommendation, while a second group of recipients (e.g., a hospital and a fire station) receives a second alert and a second recommendation.

In certain embodiments, the protected data evaluation engine 120 provides an advanced imaging mode with real time analysis of captured recordings. The protected data evaluation engine 120 analyzes the recording to detect the health condition of a user in the recording who has been hurt or is near a dangerous situation (e.g., an accident or a fire). Then, the protected data evaluation engine 120 dynamically and automatically alerts one or more recipients (e.g., the nearest hospitals, the nearest doctors, persons who are trained on the first aid, etc.) to enable the user to obtain help quickly and improve the user chances of getting better. The protected data evaluation engine 120 may provide recommendations with the alerts.

The protected data evaluation engine 120 also identifies the user and informs any relatives or friends about the user's health condition. The message relayed to relatives and friends may be customized based on relationship or other factors. For example, when a message is being sent to a parent, the protected data evaluation engine 120 may provide more details of the health condition than if the message is being sent to a friend.

The protected data evaluation engine 120 also analyzes the recording to identify data to be protected about situations while a user is taking a selfie and alerts the user about the situation. If the situation indicates a dangerous situation (e.g., a fire nearby), the protected data evaluation engine 120 also provides a recommendation of places that the user should go to for safety. For example, a user is taking a selfie at a beach and there is a big wave coming from behind the user, then the protected data evaluation engine 120 alerts the user about the big wave and recommends that the user move to higher ground for safety. Depending on how dangerous the big wave is, the protected data evaluation engine 120 may also alert relatives, friends, a beach rescue team, etc. In this case, if the user ignores the recommendation, the parents, friends or beach rescue team will be ready to come to the user's aid, if needed.

The protected data evaluation engine 120 analyzes audio recordings (e.g., portions of a video) to classify audio into potential thoughts and behavior of the person who is responsible for the audio, and, based on the analysis, may alert relatives, friends, a doctor, the police, etc.

The protected data evaluation engine 120 also may alert animal control officers, forest rangers, zoo authorities, etc. if certain animals are found in human civilization.

The protected data evaluation engine 120 is able to alert traffic police when an ambulance is struck in traffic. The protected data evaluation engine 120 is able to alert a fire station about a fire and also alert hospitals (as there may be injuries of people near the fir). For example, the protected data evaluation engine 120 may notify authorities of a building in which there is a fire. The authorities may be building managers of a building with a fire, school administrators of a school with a fire, theater managers of a theater with a fire, etc. This alerts the people who can take control of the situation and are there at the location of the fire or in surrounding places.

The protected data evaluation engine 120 may also inform forest departments about the cutting of particular trees, harm to animals, stealing of resources in the forest, etc.

Embodiments avoid maintaining one or more recordings in the local storage 134 or in the cloud data store 160. Embodiments send the one or more recordings to one or more recipients without saving the one or more recordings in any storage. This avoids the risk of having data to be protected stored in the local device 134 or in the cloud data store 160. This also avoids having to manually perform clean up by deleting the one or more recordings form one or both of the local device 134 and the cloud data store 160.

For example, with embodiments, when there are situations where a user captures images of friends and, after sending the images to a group of recipients, the images are not saved on the local device 134 or in the cloud data store 160.

Figure 5:
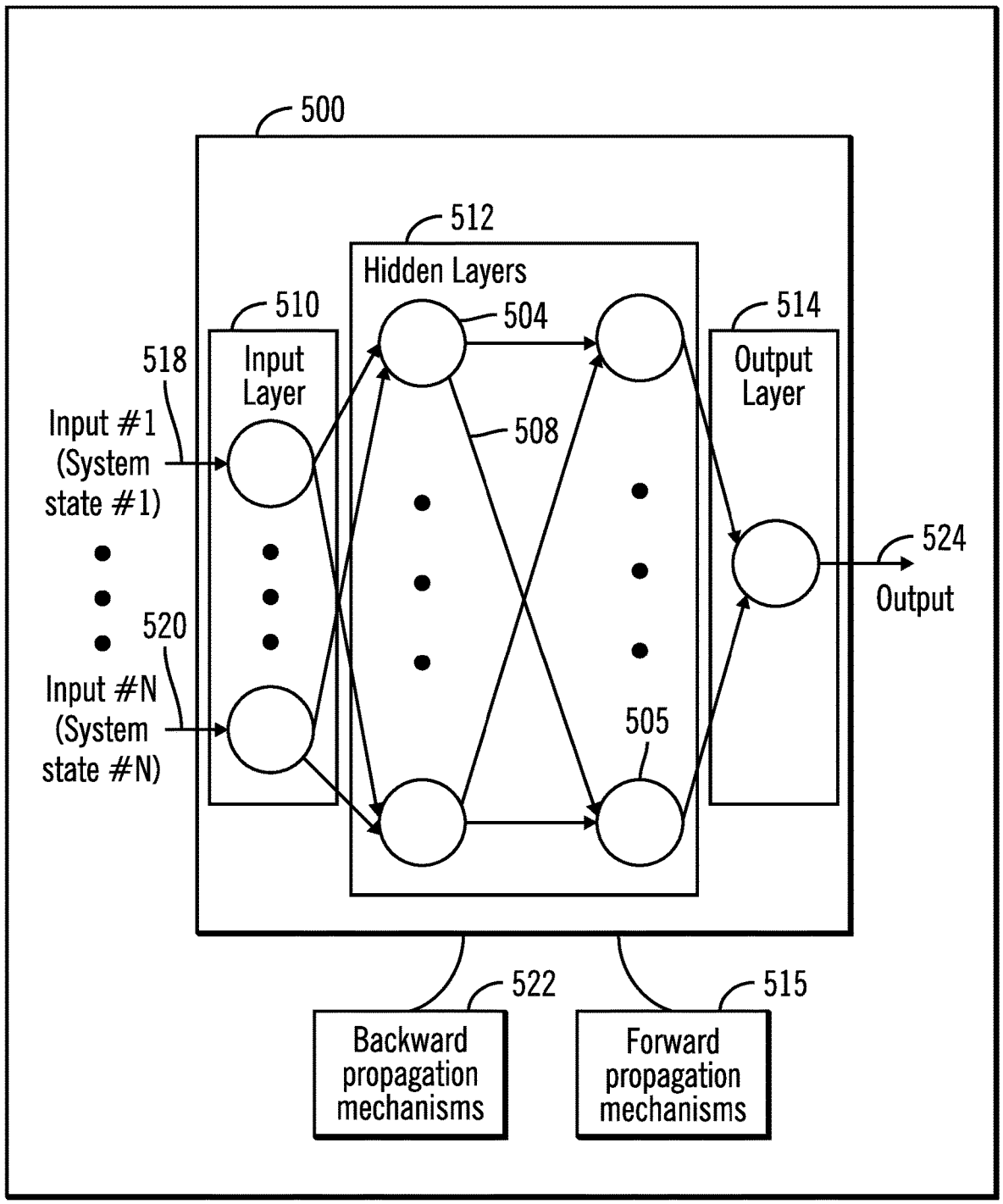
FIG. 5 illustrates, in a block diagram, details of a machine learning module in accordance with certain embodiments.

FIG. 5 illustrates, in a block diagram, details of a machine learning module 500 in accordance with certain embodiments. In certain embodiments, each of the machine learning modules 142 are implemented using the components of the machine learning module 500.

The machine learning module 500 may comprise a neural network with a collection of nodes with links connecting them, where the links are referred to as connections. For example, FIG. 5 shows a node 504 connected by a connection 508 to the node 506. The collection of nodes may be organized into three main parts: an input layer 510, one or more hidden layers 512, and an output layer 514.

The connection between one node and another is represented by a number called a weight, where the weight may be either positive (if one node excites another) or negative (if one node suppresses or inhibits another). Training the machine learning module 500 entails calibrating the weights in the machine learning module 500 via mechanisms referred to as forward propagation 516 and backward propagation 522. Bias nodes that are not connected to any previous layer may also be maintained in the machine learning module 500. A bias may be described as an extra input of 1 with a weight attached to it for a node.

In certain embodiments, the input data 518 . . . 520 are examples of inputs 240, and output 524 is an example of output 524.

In forward propagation 516, a set of weights are applied to the input data 518 . . . 320 to calculate the output 524. For the first forward propagation, the set of weights may be selected randomly or set by, for example, a system administrator. That is, in the forward propagation 516, embodiments apply a set of weights to the input data 518 . . . 520 and calculate an output 524.

In backward propagation 522 a measurement is made for a margin of error of the output 524, and the weights are adjusted to decrease the error. Backward propagation 522 compares the output that the machine learning module 500 produces with the output that the machine learning module 500 was meant to produce, and uses the difference between them to modify the weights of the connections between the nodes of the machine learning module 500, starting from the output layer 514 through the hidden layers 512 to the input layer 510, i.e., going backward in the machine learning module 500. In time, backward propagation 522 causes the machine learning module 500 to learn, reducing the difference between actual and intended output to the point where the two come very close or coincide.

The machine learning module 500 may be trained using backward propagation to adjust weights at nodes in a hidden layer to produce adjusted output values based on the provided inputs 240. A margin of error may be determined with respect to the actual output 524 from the machine learning module 224 and an expected output to train the machine learning module 500 to produce the desired output value based on a calculated expected output. In backward propagation, the margin of error of the output may be measured and the weights at nodes in the hidden layers 512 may be adjusted accordingly to decrease the error.

Backward propagation may comprise a technique for supervised learning of artificial neural networks using gradient descent. Given an artificial neural network and an error function, the technique may calculate the gradient of the error function with respect to the artificial neural network's weights.

Thus, the machine learning module 500 is configured to repeat both forward and backward propagation until the weights of the machine learning module 500 are calibrated to accurately predict an output.

The machine learning module 500 implements a machine learning technique such as decision tree learning, association rule learning, artificial neural network, inductive programming logic, support vector machines, Bayesian models, etc., to determine the output value 524.

In certain machine learning module 500 implementations, weights in a hidden layer of nodes may be assigned to these inputs to indicate their predictive quality in relation to other of the inputs based on training to reach the output value 524 (e.g., recommended alert).

With embodiments, the machine learning module 500 is a neural network, which may be described as a collection of "neurons" with "synapses" connecting them.

With embodiments, there may be multiple hidden layers 512, with the term "deep" learning implying multiple hidden layers. Hidden layers 512 may be useful when the neural network has to make sense of something complicated, contextual, or non-obvious, such as image recognition. The term "deep" learning comes from having many hidden layers. These layers are known as "hidden", since they are not visible as a network output.

In certain embodiments, training a neural network may be described as calibrating all of the "weights" by repeating the forward propagation 516 and the backward propagation 522.

In backward propagation 522, embodiments measure the margin of error of the output and adjust the weights accordingly to decrease the error.

Neural networks repeat both forward and backward propagation until the weights are calibrated to accurately predict the output 524.

Figure 6:
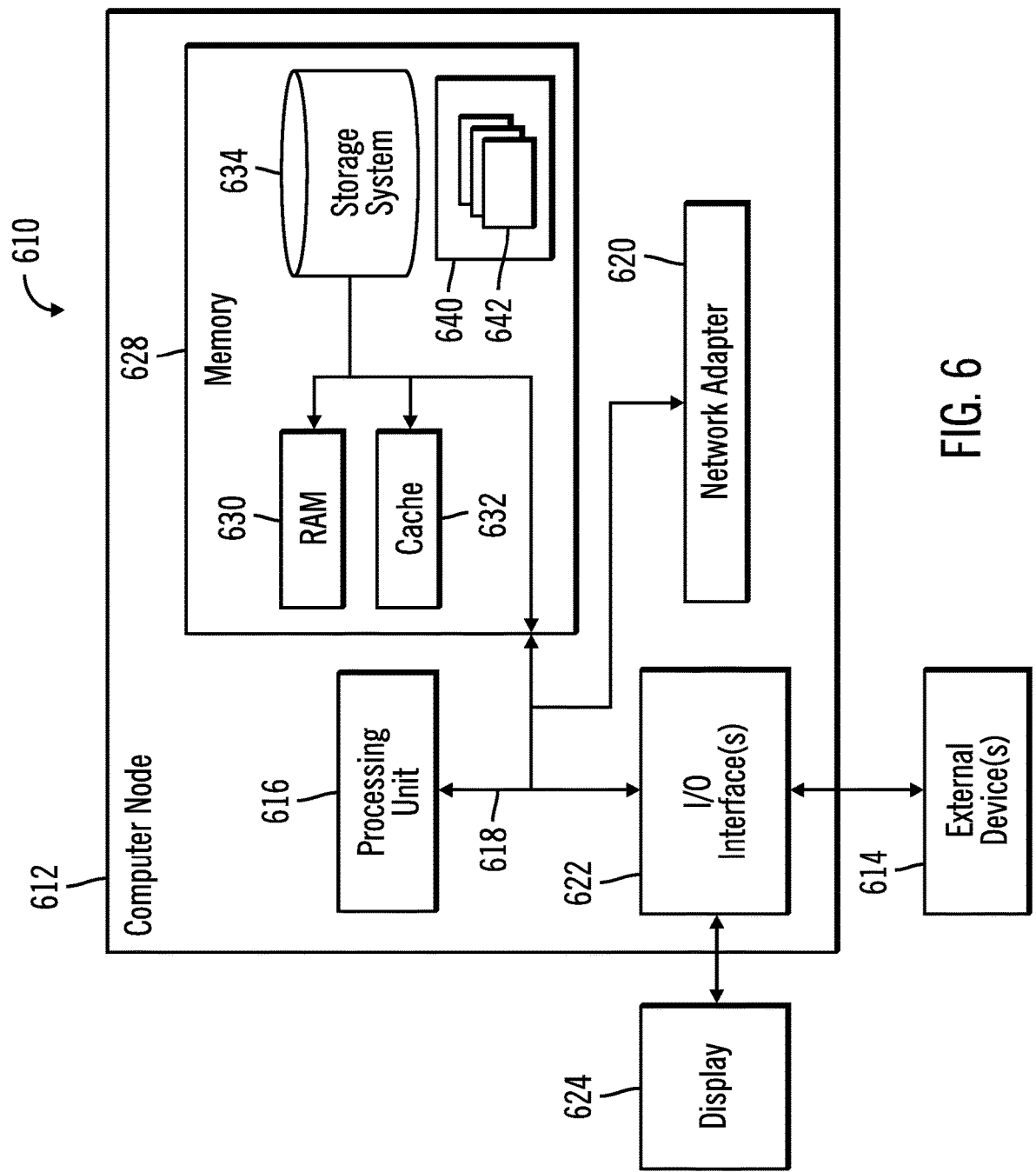
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the computing device 100 has the architecture of computer node 612. In certain embodiments, the computing device 100 is part of a cloud infrastructure. In certain alternative embodiments, the computing device 100 is not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
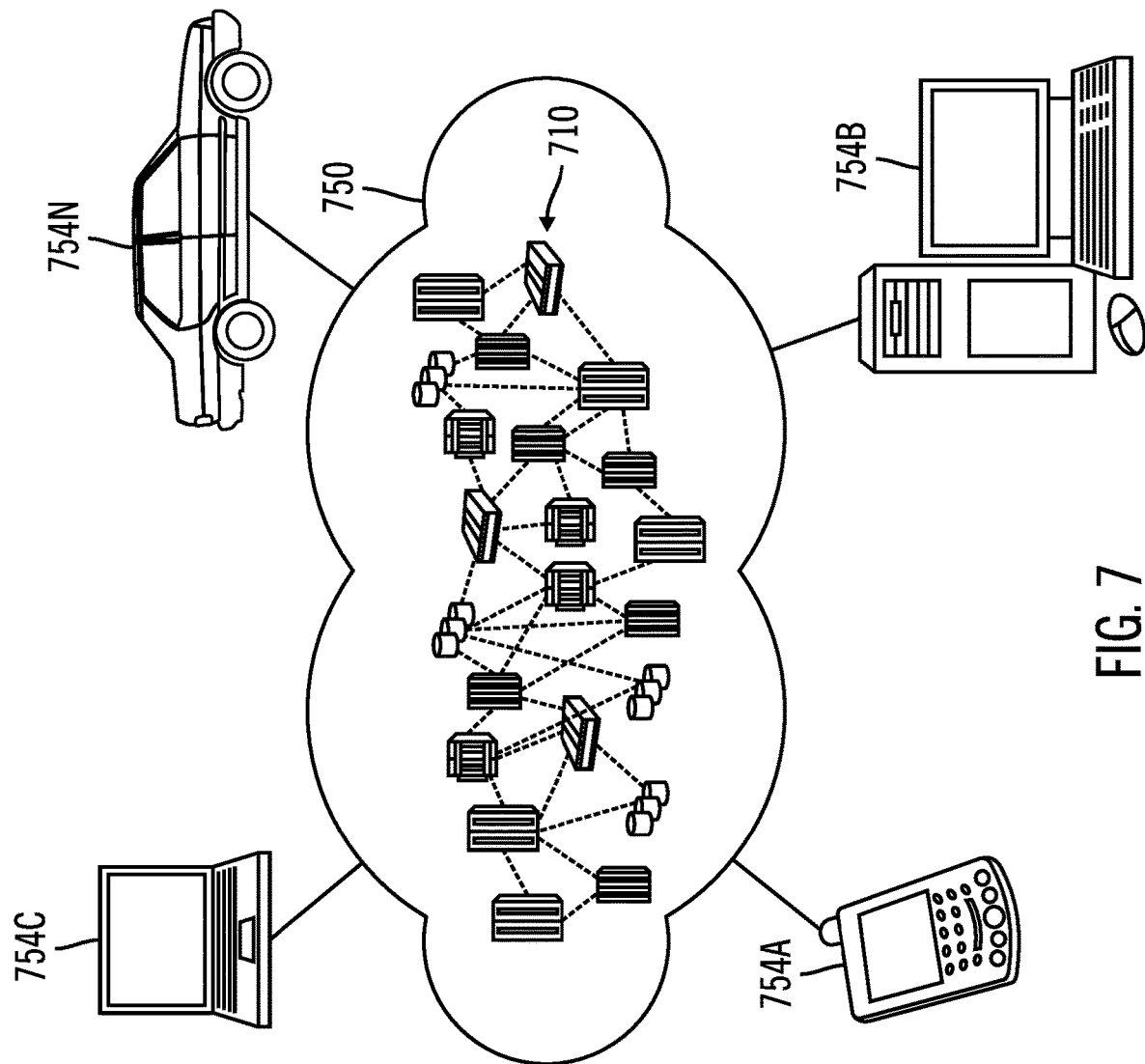
FIG. 7 illustrates a cloud computing environment in accordance with certain embodiments.

Referring now to FIG. 7, illustrative cloud computing environment 720 is depicted. As shown, cloud computing environment 720 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 720 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 720 can communicate with any type of computerized device over any type of network and/or network addressable connection (e.g., using a web browser).

Figure 8:
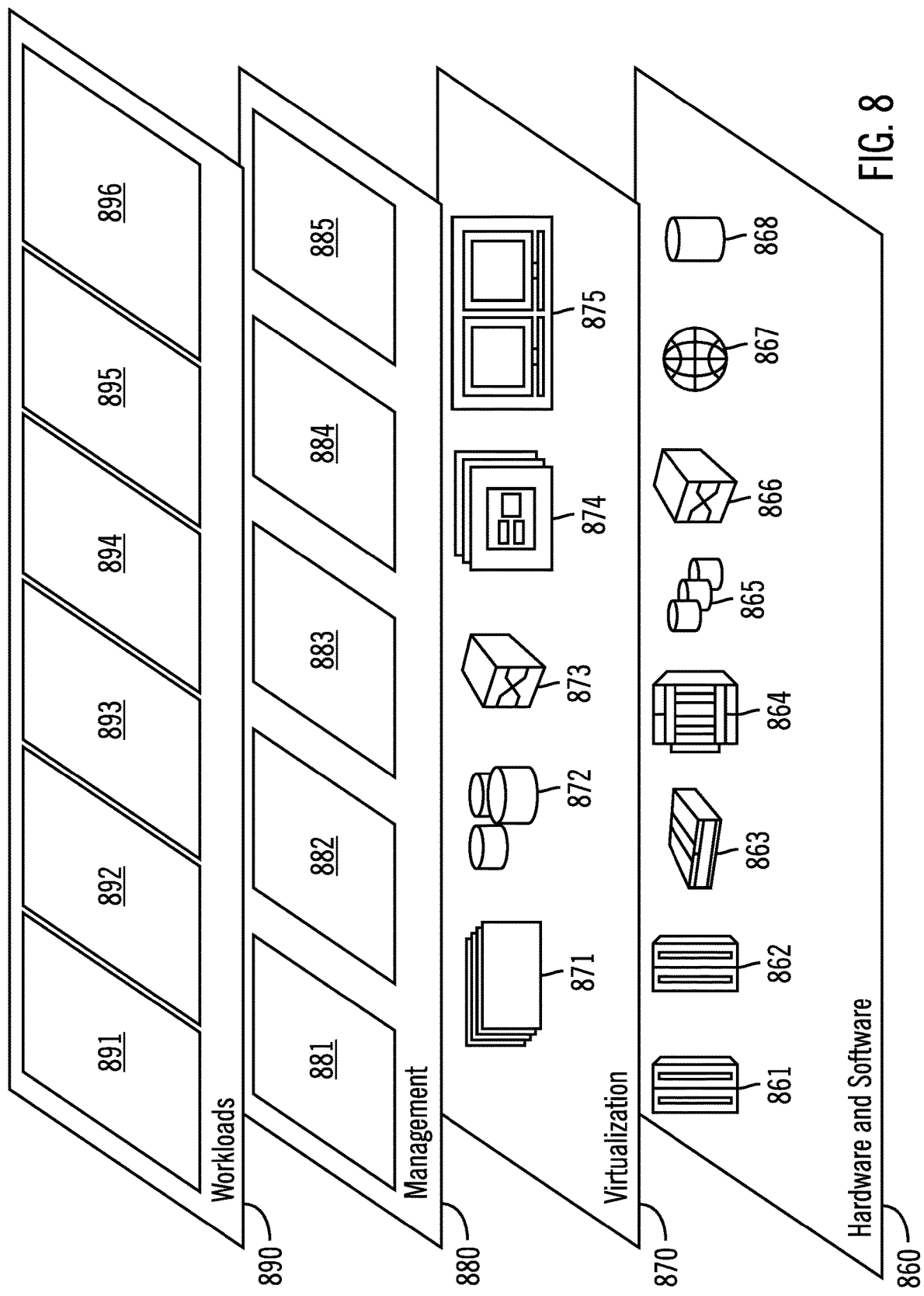
FIG. 8 illustrates abstraction model layers in accordance with certain embodiments.

Referring now to FIG. 8, a set of functional abstraction layers provided by cloud computing environment 720 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and analyzing recordings for data to be protected and identifying recipients and alerts 896.

Thus, in certain embodiments, software or a program, implementing analysis of recordings for data to be protected and identifying recipients and alerts in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended.

The foregoing description provides examples of embodiments of the invention, and variations and substitutions may be made in other embodiments.

What is claimed is:

1. A computer-implemented method, comprising operations for:
   storing a recording in temporary storage of a device, wherein the recording is one of an image and a video;
   determining whether there is data to be protected about a situation in the recording;
   in response to determining that there is data to be protected,
      identifying one or more recipients based on the data to be protected about the situation;
      identifying one or more first alerts for the one or more recipients and one or more second alerts for a user of the device based on the data to be protected about the situation;
      sending the one or more first alerts to the one or more recipients along with the recording;
      sending the one or more second alerts to the user; and
      deleting the recording from the temporary storage.

2. The computer-implemented method of claim 1, wherein another recording comprises an audio recording.

3. The computer-implemented method of claim 1, further comprising operations for:
   identifying a recommendation for an alert of the one or more alerts.

4. The computer-implemented method of claim 1, wherein rules are used to identify the data to be protected about the situation, the one or more recipients, and the one or more alerts.

5. The computer-implemented method of claim 1, wherein machine learning modules are used to identify the data to be protected about the situation, the one or more recipients, and the one or more alerts.

6. The computer-implemented method of claim 1, wherein a Software as a Service (SaaS) is configured to perform the operations of the method.

7. The computer-implemented method of claim 1, further comprising operations for:
   in response to determining that there is no data to be protected,
      sending the recording to the one or more recipients; and
      storing the recording in cloud data storage.

8. A computer program product, the computer program product comprising a computer readable storage medium having program code embodied therewith, the program code executable by at least one processor to perform operations for:
   storing a recording in temporary storage of a device, wherein the recording is one of an image and a video;
   identifying determining whether there is data to be protected about a situation in the recording;
   in response to determining that there is data to be protected,
      identifying one or more recipients based on the data to be protected about the situation;
      identifying one or more first alerts for the one or more recipients and one or more second alerts for a user of the device based on the data to be protected about the situation;
      sending the one or more first alerts to the one or more recipients along with the recording;
      sending the one or more second alerts to the user; and
      deleting the recording from the temporary storage.

9. The computer program product of claim 8, wherein another recording comprises an audio recording.

10. The computer program product of claim 8, wherein the program code is executable by the at least one processor to perform further operations for:
    identifying a recommendation for an alert of the one or more alerts.

11. The computer program product of claim 8, wherein rules are used to identify the data to be protected about the situation, the one or more recipients, and the one or more alerts.

12. The computer program product of claim 8, wherein machine learning modules are used to identify the data to be protected about the situation, the one or more recipients, and the one or more alerts.

13. The computer program product of claim 8, wherein a Software as a Service (SaaS) is configured to perform the operations of the computer program product.

14. The computer program product of claim 8, wherein the program code is executable by the at least one processor to perform further operations for:
    in response to determining that there is no data to be protected,
       sending the recording to the one or more recipients; and
       storing the recording in cloud data storage.

15. A computer system, comprising:
    one or more processors, one or more computer-readable memories and one or more computer-readable, tangible storage devices; and
    program instructions, stored on at least one of the one or more computer-readable, tangible storage devices for execution by at least one of the one or more processors via at least one of the one or more computer-readable memories, to perform operations comprising:
       storing a recording in temporary storage of a device, wherein the recording is one of an image and a video;
       determining whether there is data to be protected about a situation in the recording;
       in response to determining that there is data to be protected,
          identifying one or more recipients based on the data to be protected about the situation;
          identifying one or more first alerts for the one or more recipients and one or more second alerts for a user of the device based on the data to be protected about the situation;
          sending the one or more first alerts to the one or more recipients along with the recording;
          sending the one or more second alerts to the user; and
          deleting the recording from the temporary storage.

16. The computer system of claim 15, wherein another recording comprises an audio recording.

17. The computer system of claim 15, wherein the operations further comprise:
    identifying a recommendation for an alert of the one or more alerts.

18. The computer system of claim 15, wherein rules are used to identify the data to be protected about the situation, the one or more recipients, and the one or more alerts.

19. The computer system of claim 15, wherein machine learning modules are used to identify the data to be protected about the situation, the one or more recipients, and the one or more alerts.

20. The computer system of claim 15, wherein a Software as a Service (SaaS) is configured to perform the operations of the computer system.

* * * * *